(12) United States Patent
Anders et al.

(10) Patent No.: US 10,876,265 B2
(45) Date of Patent: Dec. 29, 2020

(54) MODULAR HYDROPOWER UNIT

(71) Applicant: BVH, Inc., Overland Park, KS (US)

(72) Inventors: Jay A. Anders, Ooltewah, TN (US); Molly O'Connor, New York, NY (US); Aaron W. Lemke, Overland Park, KS (US); Brian Murtha, Huntersville, NC (US); Stephen Bowers, Hixson, TN (US); David Gatto, Chanhassen, MN (US)

(73) Assignee: BVH, INC., Overland Park, KS (US)

( * ) Notice: Subject to any disclaimer, the term of this patent is extended or adjusted under 35 U.S.C. 154(b) by 0 days.

(21) Appl. No.: 16/381,164

(22) Filed: Apr. 11, 2019

(65) Prior Publication Data

US 2019/0316310 A1      Oct. 17, 2019

Related U.S. Application Data

(60) Provisional application No. 62/656,104, filed on Apr. 11, 2018, provisional application No. 62/677,224, filed on May 29, 2018, provisional application No. 62/688,071, filed on Jun. 21, 2018.

(51) Int. Cl.
*E02B 9/02* (2006.01)
*F03B 13/08* (2006.01)

(52) U.S. Cl.
CPC .............. *E02B 9/02* (2013.01); *F03B 13/08* (2013.01)

(58) Field of Classification Search
CPC .......... Y02E 10/28; F03B 13/08; F03B 13/10; E02B 9/04; E02B 9/00; E02B 9/02
See application file for complete search history.

(56) References Cited

U.S. PATENT DOCUMENTS

| 4,755,690 | A | 7/1988 | Obermeyer | |
| 4,774,157 | A * | 9/1988 | Manring | G03C 5/58 430/14 |
| 4,804,855 | A * | 2/1989 | Obermeyer | F03B 13/08 290/43 |
| 6,281,597 | B1 | 8/2001 | Obermeyer et al. | |
| 2004/0222641 | A1 | 11/2004 | Panholzer | |
| 2006/0266038 | A1* | 11/2006 | Krouse | F03B 17/061 60/641.7 |
| 2008/0143116 | A1* | 6/2008 | Obermeyer | F03B 13/08 290/54 |

(Continued)

FOREIGN PATENT DOCUMENTS

WO      2013-089958      6/2013

OTHER PUBLICATIONS

International Search Report and Written Opinion, dated Jul. 29, 2019, 12 pages.

*Primary Examiner* — Carib A Oquendo
(74) *Attorney, Agent, or Firm* — Hovey Williams LLP

(57) ABSTRACT

A portable hydropower module is provided for the generation of economical hydroelectric power at low-head sites, such as dams and weirs. More particularly, the portable hydropower modules are able to streamline the construction of power generation facilities and improve the economics of hydropower development for low-head sites. The portable hydropower modules may be produced off-site and then transported, such as by floating, to the designated low-head site. The portable hydropower modules may be specifically designed to efficiently facilitate the energy capabilities at the chosen low-head sites.

17 Claims, 10 Drawing Sheets

(56) References Cited

U.S. PATENT DOCUMENTS

| | | | |
|---|---|---|---|
| 2011/0089695 A1 | 4/2011 | Krouse et al. | |
| 2012/0235416 A1* | 9/2012 | Rutschmann | E02B 9/022 290/54 |
| 2013/0115045 A1* | 5/2013 | Korac | F03B 17/064 415/8 |
| 2013/0140825 A1* | 6/2013 | Holstein | F03B 13/08 290/54 |
| 2014/0102989 A1* | 4/2014 | Fonkenell | E02B 8/023 210/741 |
| 2016/0312760 A1* | 10/2016 | Ives | F03B 13/10 |
| 2018/0106236 A1* | 4/2018 | Lee | F03B 17/06 |

\* cited by examiner

MODULAR HYDROPOWER UNIT

RELATED APPLICATIONS

This application claims the priority benefit under 35 U.S.C. § 119(e) of U.S. Provisional Patent Application Ser. No. 62/656,104 entitled "MODULAR HYDROPOWER UNIT," filed Apr. 11, 2018; U.S. Provisional Patent Application Ser. No. 62/677,224 entitled "MODULAR HYDROPOWER UNIT," filed May 29, 2018; and U.S. Provisional Patent Application Ser. No. 62/688,071 entitled "MODULAR HYDROPOWER UNIT," filed Jun. 21, 2018, the entire disclosures of which are incorporated herein by reference.

BACKGROUND

1. Field of the Invention

The present invention is generally related to system designs for economical hydroelectric power generation.

2. Description of the Related Art

Numerous low-head hydropower sites exist within the United States, which are unused for hydropower production. These sites vary from existing flood control dams, existing locks and dams, existing overflow dams, and undeveloped low-head sites. An assessment of energy potential at non-powered dams in the Unites States compiled by the Department of Energy's Oak Ridge National Laboratory estimated a total technical potential of about 12,000 MW. To date, one of the major limitations to the development of this technical hydropower potential has been the cost to construct the infrastructure necessary to install the generating equipment.

Traditional hydropower developments generally consist of cast-in-place concrete structures that require: (i) cofferdams to divert the water flow, (ii) foundations set on rock, and (iii) large volumes of concrete to anchor the powerhouse against hydraulic forces. These traditional hydropower developments have been successfully employed for over 100 years but represent a high capital investment for low-head sites, which makes economic development of low-head hydropower difficult using the traditional development.

The object of the present application is to streamline the construction of power generation facilities and improve the economics of hydropower development for low-head sites.

SUMMARY

One or more embodiments of the present invention generally concern a method for producing a hydropower system. The method generally comprises (a) producing a hydropower modular unit at a first location and (b) installing the hydropower modular unit at a second location. Generally, the hydropower modular unit comprises an intake, a trash rack, a turbine generator unit, and a draft tube.

One or more embodiments of the present invention generally concern a method for producing a hydropower system. The method generally comprises (a) providing a hydropower modular unit at a first location, wherein the hydropower modular unit comprises an intake, a trash rack, a turbine generator unit, and a draft tube; (b) floating or shipping the hydropower modular unit to a low-head site comprising a weir or dam; and (c) installing the hydropower modular unit at the low-head site.

One or more embodiments of the present invention generally concern a portable hydropower modular unit. Generally, the portable hydropower modular unit comprising: (a) an intake, (b) a trash rack, (c) a turbine generator unit, and (d) a sealed draft tube.

BRIEF DESCRIPTION OF THE FIGURES

Embodiments of the present invention are described herein with reference to the following drawing figures, wherein.

DETAILED DESCRIPTION

Figure 1:
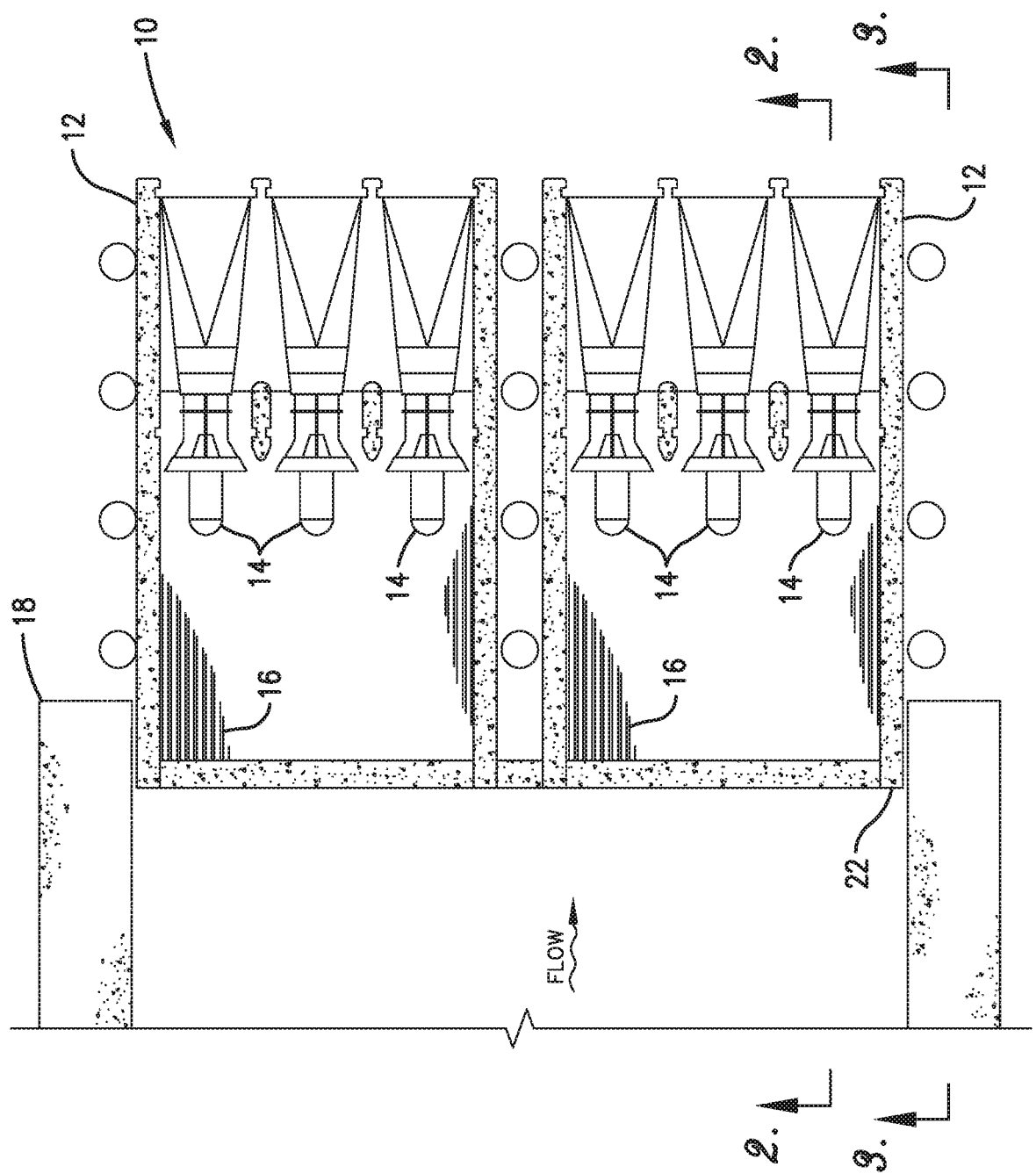
FIG. 1 depicts a plan view of a modular hydropower unit according to one embodiment of the present invention.

The present invention is directed to a modular hydropower system for streamlining the construction of power generation facilities and improving the economics of hydropower development for low-head sites. Generally, the modular hydropower units of the present invention are intended to be used at existing water-retention structures, such as low-head dams, which do not currently utilize all available water for electricity generation. The modular hydropower unit(s) may be placed within an existing gate bay, within an unused lock, or downstream of a low-head dam to thereby force water to flow through the turbine generator unit(s) and generate electricity. The modular hydropower unit(s) may be placed upstream of the existing infrastructure, downstream of the existing infrastructure, or the existing infrastructure may be modified to be replaced with the modular hydropower unit(s). As used herein, a "low-head site" refers to any water-based site where the head, i.e., the vertical difference between the headwater elevation and the tailwater elevation, is 20 meters or less.

Typically, the modular hydropower systems of the present invention comprise standard-sized modules that are constructed (or fabricated) off-site to house the generating equipment. In other words, the modules may be produced in a manufacturing facility at a location away from the resulting installation site. For example, the modular hydropower modules may be constructed or fabricated in-part or totally at an international or local facility away from the installation site. The modules can then be transported to the low-head site by shipping or floating for installation on a prepared foundation. This floating and shipping may be accomplished by sealing the draft tube and floating the module to the designated site. The floating may be carried out by a tug boat, barge, or any other water-based craft capable of transporting the module via a waterway. Shipping may be accomplished by segmented construction off-site, shipping by barge or any other water-based craft, and final segments assembled at the installation site. The prepared foundation may be an existing rock surface, concrete, piles, or other sturdy foundations that may provide a level surface for the module to rest and restrain the module against hydraulic and buoyancy forces as necessary. The modules may be sunk in the water, placed in position relative to the prepared foundation, and fastened to the prepared foundation using any mechanisms known in the art including, for example, by mechanical fastening, anchoring, structural concrete, and/or grouting. The standardization of modules allows for a more rapid installation of the systems and may also result in decreased installation costs. Consequently, the efficiencies associated with the standardization of the modules may allow installation costs to be low enough to sell the resulting electricity at a profit.

In various embodiments, the modular hydropower units may comprise, consist essentially of, or consist of a single module containing an intake, a trash rack, a turbine generator unit, and a draft tube. As noted above, the modular hydropower units may be constructed or fabricated in-part or totally at a facility located away from the installation site. Afterwards, the modular hydropower units may be moved to the instillation site by any means known in the art. In certain embodiments, the modular hydropower units may be floated to the instillation site and sunk to contact the prepared foundation. In one or more embodiments, the modular hydropower units are floated to the designated sites by sealing the draft tube and floating the module or via a barge.

Since the modular hydropower units are produced off-site, they can be produced as a standard unit, which may be broadly applied and installed at multiple sites. Furthermore, multiple modular hydropower units may be combined at an individual site in order to increase power output for a given head and flow. For instance, at least 2, 3, 4, 5, 6, 7, or 8 modular hydropower units may be installed at a single site. In one or more embodiments, all of the modular hydropower units installed at a single site may have the same structure and configuration. Alternatively, the modular hydropower units may have different shapes and configurations depending on the configuration of the installation site.

In various embodiments, the turbine generator units can comprise non-supplier specific, commercially-available turbine generator units in a horizontal, vertical, or angled arrangement. Furthermore, the modules can comprise at least 1, 2, 3, 4, 5, or 6 turbine generator units depending on the configuration of the installation site.

In various embodiments, the modular hydropower units comprise an inflow at the upstream end in the form of an overflow of a weir at the front of the module, a lowered front section, or a water conveyance structure. In embodiments where a water conveyance structure is used, the water conveyance structure can comprise pipes, an open channel, a closed channel, a siphon, and/or a submerged underwater chamber. Furthermore, in certain embodiments, the water conveyance structure may be directly connected to the modular hydropower units. Alternatively, seals may be used to connect the modular hydropower unit and the water conveyance structure. Additionally, in various embodiments, the water conveyance structure may have gates or valves placed therein to isolate water flow, flush debris from the system, enable the passage of fish, and/or allow for additional water release.

Furthermore, in various embodiments, the modular hydropower units may be placed: (i) within an existing gate bay or unused lock, (ii) immediately downstream of an overflow section of a weir or dam, (iii) as a section of a newly-constructed weir or dam, (iv) within a notch cut in an existing weir or dam, or (v) downstream or upstream of any water retention structure. In certain embodiments, the modular hydropower units may be integrated with existing lock and dam structures in order to minimize the changes to the existing structure. In embodiments where the modular hydropower unit is used in conjunction with a water conveyance structure and is placed downstream or upstream of a water retention structure, the water conveyance structure may be used to transfer water from the water retention structure and the modular hydropower unit.

When in operation, the inlet water stream first passes through a trash rack system of the modular hydropower unit, which prevents debris that is too large for the generating equipment to pass through to the discharge. Consequently, this may prevent the large debris from damaging the generating equipment. The trash rack system generally functions via hydraulic action. In one or more embodiments, the trash rack system can comprise a vertical, inclined (e.g., angled), or horizontal configuration that is defined by the positioning of the screen relative to the flow of water. In certain embodiments, the trash rack system can comprise an inclined trash rack system that comprises a screen that is at least partially inclined relative to the flow of the water. The inclined trash rack can be used in certain environments where an inclined grate or screen is superior to catching debris in the waterways. Furthermore, inclined trash rack systems can be easier to clean and remove debris therefrom due to the sloped screen face of the systems. In various embodiments, the debris may be cleared from the trash rack systems via hydraulic action. After passing the trash rack, the water passes through a turbine generator unit to generate electricity.

In various embodiments, the modular hydropower system may comprise a series of bulkheads, stoplogs, valves, or gates to allow for the isolation of a single hydropower unit or all of the hydropower units for dewatering and inspection. In certain embodiments, the modular hydropower units may utilize existing gates (where available) for safety and maintenance/isolation of the units. For instance, gates and/or valves may be placed between adjacent individual hydropower modules, between individual generator units, in the walls of the hydropower modules, and/or within the module-retaining structures to thereby flush debris from the hydropower system, enable the passage of fish, and/or to allow for additional water release from the system.

The modular hydropower units may be sealed against existing concrete foundations by an adjustable gate and a resilient seal or an inflatable seal filled with a gas or liquid to conform to the irregularities of the concrete. In certain embodiments, the modular hydropower units comprise an adjustable sealing system attached to the module for sealing gaps of varying distances and non-uniform shapes between the existing foundation and the modular hydropower units.

In various embodiments, the modular hydropower units can comprise a gate system on the downstream end for controlling the water level and releasing flood flows. In certain embodiments, the modular hydropower units can be configured with the gate systems so that the modular hydropower units can release excess water flow when the units become overtopped by flood flows. In such embodiments, the gate systems can comprise walls that facilitate the flow of overtopping flood waters from the modular hydropower units. Furthermore, the modular hydropower units may be integrated with existing lock or dam structures in order to minimize the changes to the existing structure. Moreover, in certain embodiments, the modular hydropower units may utilize existing gates (where available) for safety and maintenance/isolation of the units.

In various embodiments, the modular hydropower units may be adjusted to site-specific conditions by adjusting the properties (e.g., height, width, structure, etc.) of the existing foundation. For instance, the type of foundation may be altered or certain structural aspects of the foundation (e.g., wall height) may be adjusted accordingly.

In various embodiments, the modular hydropower units may be supported on drilled shaft foundations, which provide vertical support and anchorage and help resist lateral load. Furthermore, in certain embodiments, the modular hydropower units may be installed without the use of a cofferdam. The modular hydropower units may be fastened to the foundation (e.g., a prepared foundation) by mechanical fastening, anchoring, structural concrete, and/or grouting.

When site conditions permit, the modular hydropower units may be installed without requiring excavation to the existing water ways at the low-head site.

In many embodiments, the modular hydropower units may have minimal impact on the existing site's free flood conditions.

Generally, the operation and service of the modular hydropower units are not limited by the chemical properties of the water at the low-head site (e.g., salinity, pH, temperature, total suspended solids, electrical conductivity, etc.).

FIG. 1 depicts a plan view of a modular hydropower unit 10 according to one embodiment of the present invention. As shown in FIG. 1, the modular hydropower unit 10 comprises two modules 12, with each module 12 comprising three turbine generator units 14, although the number of modules and turbine generator units may vary based on the chosen site. Each module 12 also comprises a trash rack 16. As shown in FIG. 1, the modules 12 of the modular hydropower unit 10 may be sealed against an existing water retention structure 18 (e.g., a flood control structure, navigation lock, or overflow dam). Furthermore, the modular hydropower unit 10 may be installed without the use of a cofferdam prior to the arrival of the modular hydropower unit at the site.

Figure 2:
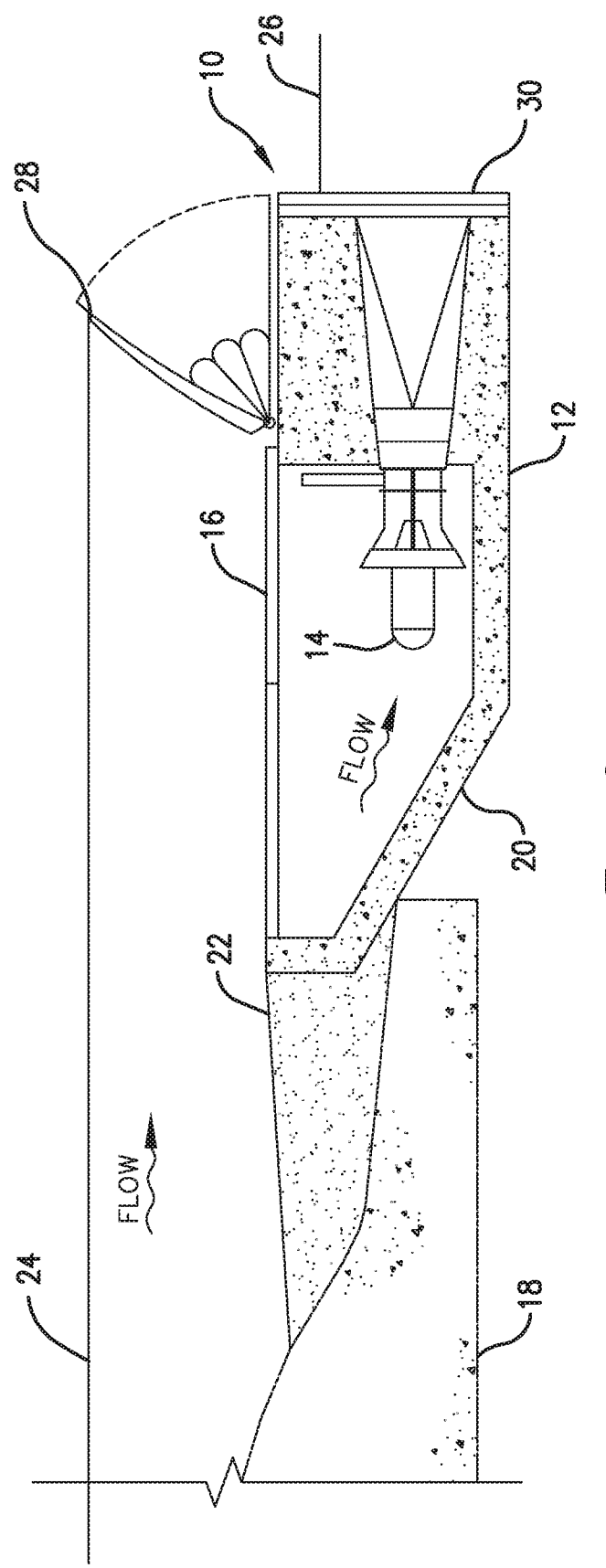
FIG. 2 depicts a section view of a modular hydropower unit taken along line 2-2 of FIG. 1 according to one embodiment of the present invention.

FIG. 2 depicts a section view of a modular hydropower unit 10 positioned at a low-head site. As shown in FIG. 2, the module 12 with a turbine generator unit 14 is positioned next to an existing water-retention structure 18 and below the trash rack 16. The trash rack 16 may also have a hatch that can be opened, thereby allowing one to access the inside of the modular hydropower unit 10. Furthermore, as depicted in FIG. 2, the shape, length, and depth of the intake of the module 20 may be varied based on the arrangement of the site. FIG. 2 also depicts the area 22 that may need to be filled and/or sealed after the modular hydropower unit 10 has been put into position. Finally, FIG. 2 depicts the position of the headwater elevation 24, tailwater elevation 26, the water-retaining spill gate 28, and the water isolation gate guides 30 relative to the module 12.

Figure 3:
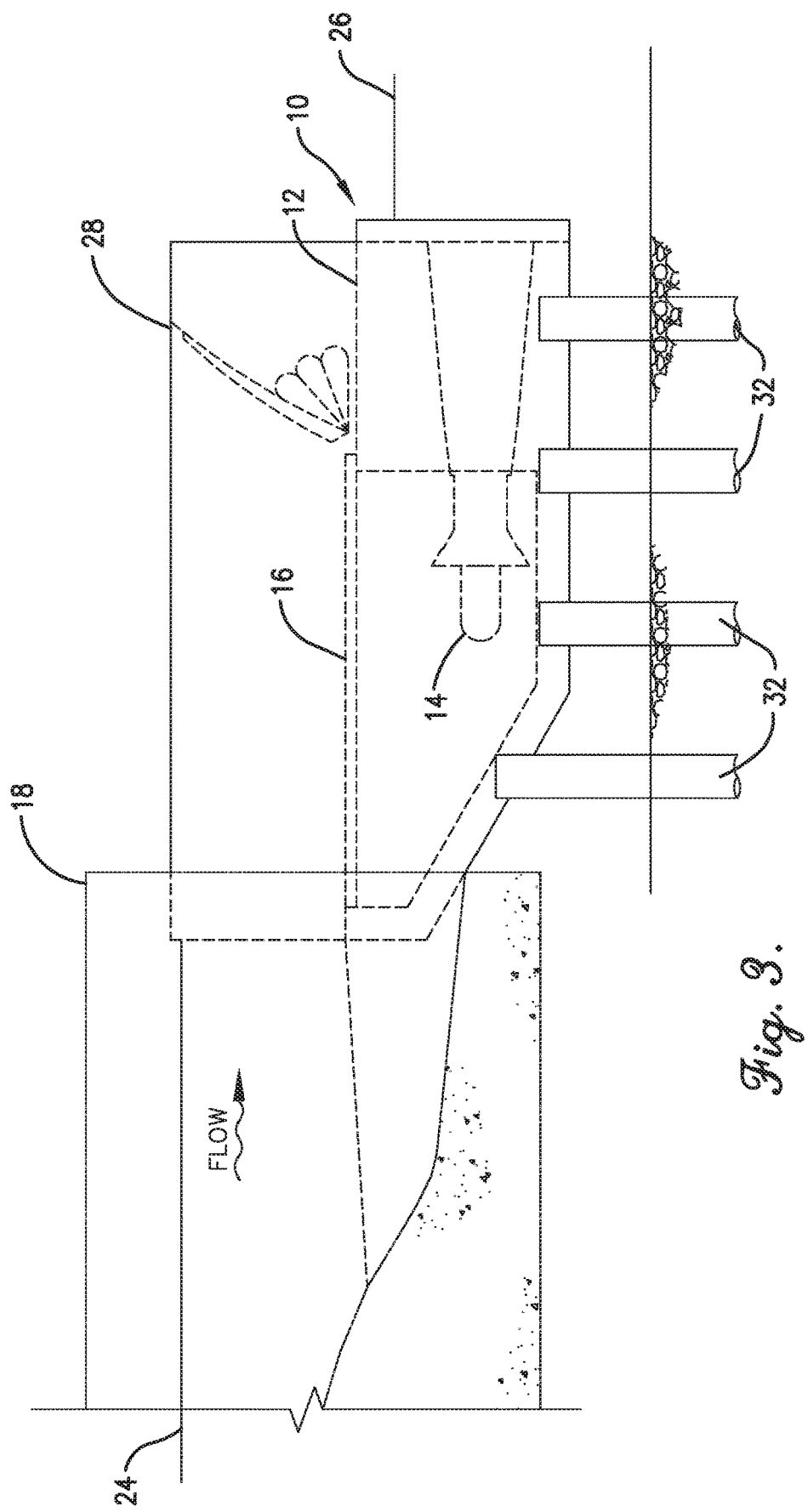
FIG. 3 depicts a side view of a modular hydropower unit taken along line 3-3 of FIG. 1 according to one embodiment of the present invention.

FIG. 3 depicts a side view of the modular hydropower unit 10 installed at a low-head site. As shown in FIG. 3, the modular hydropower unit 10 may be installed on the foundation 32 without a cofferdam prior to the arrival of the module 12. The foundation 32 in FIG. 3 is in the form of a drilled shaft foundation. FIG. 3 also depicts the position of the headwater elevation 24 and the tailwater elevation 26 relative to the module 12.

Figure 4:
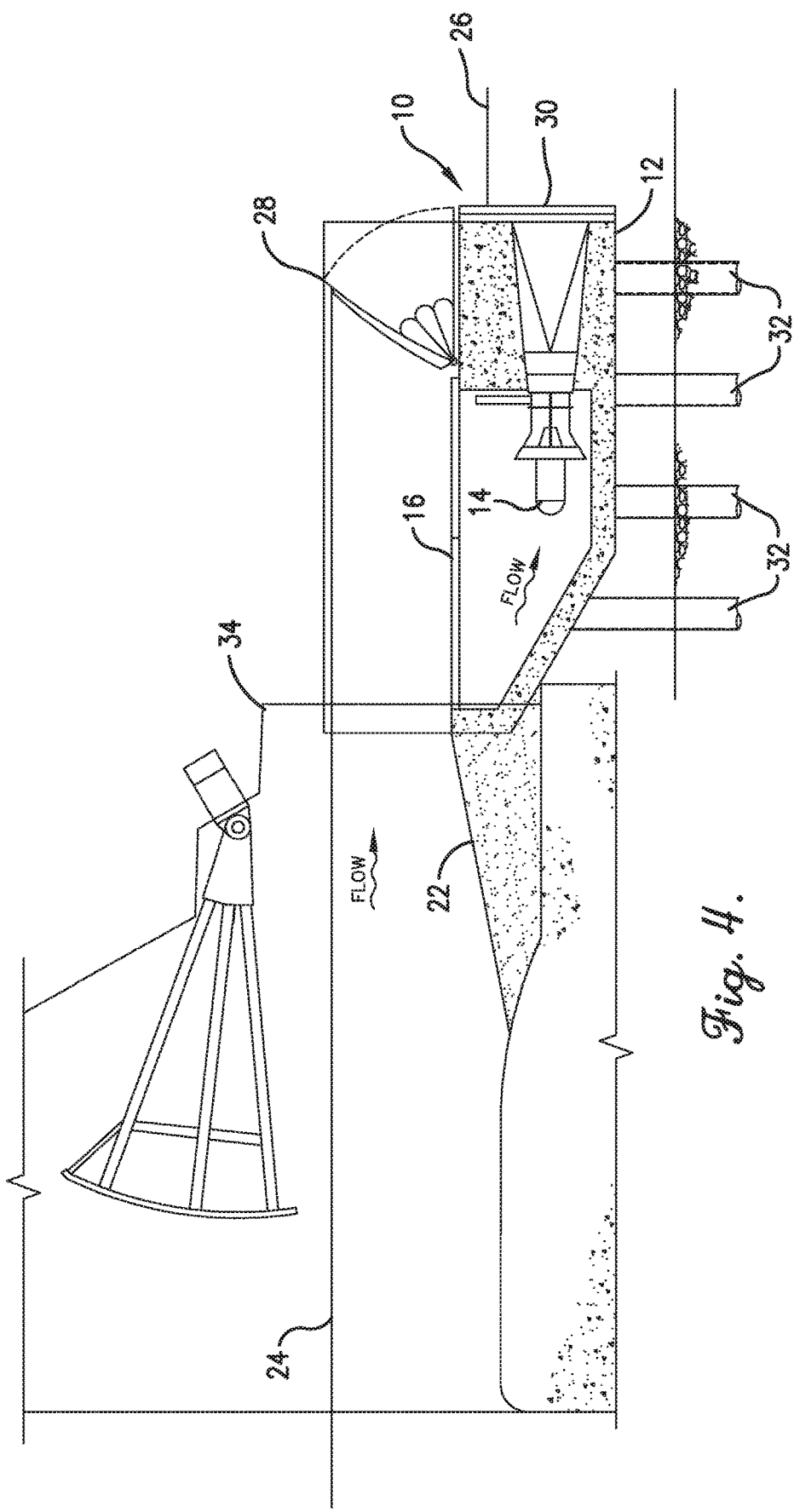
FIG. 4 depicts a typical installation of a gated structure in a modular hydropower unit of the present invention.

FIG. 4 depicts a typical installation of a gated structure 34 with the modular hydropower unit 10. As shown in FIG. 4, the gate connected to the gated structure 34 may be positioned above the headwater elevation 24.

Figure 5:
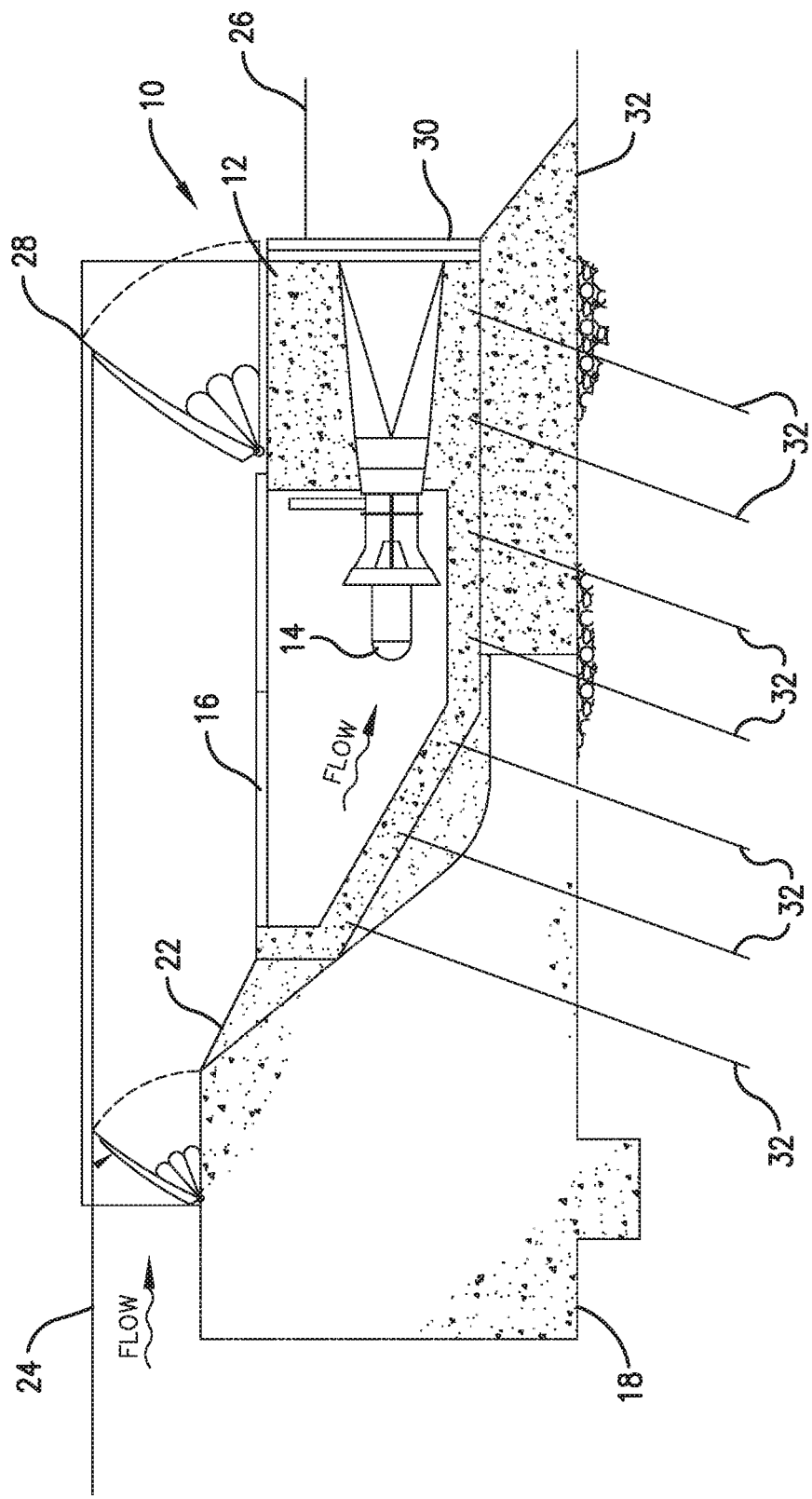
FIG. 5 depicts a typical installation of an overflow structure in a modular hydropower unit of the present invention.

FIG. 5 depicts a typical installation of an overflow structure 18 with the modular hydropower unit 10. As shown in FIG. 4, the modular hydropower unit 10 may be specifically positioned in relation to the existing water-retention overflow structure 18 at the low-head site. In addition, FIG. 5 depicts how the modular hydropower unit 10 may be set into position via anchors 32 that connect to a foundation pad, which may be installed beforehand without a cofferdam. Furthermore, area 22 depicts the area between the modular hydropower unit 10 and the overflow structure 18 that can be filled in and/or sealed after place of the unit 10.

Figure 6:
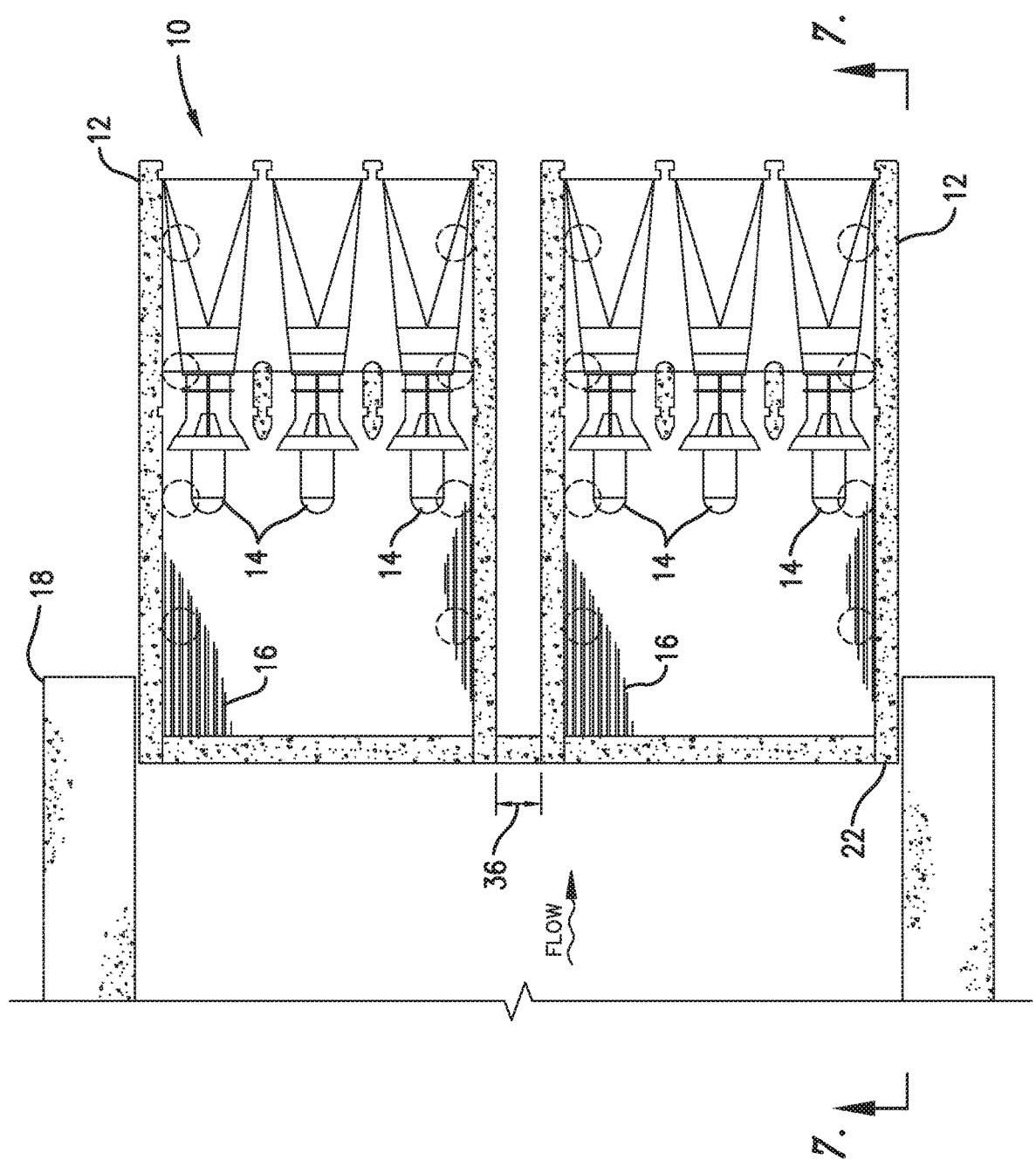
FIG. 6 depicts a plan view of a modular hydropower unit with an alternative foundation and gated area according to one embodiment of the present invention.

FIG. 6 depicts a plan view of a modular hydropower unit 10 according to one embodiment of the present invention. Unlike the embodiment depicted in FIG. 1, the modular hydropower unit 10 of FIG. 6 comprises an area 36 for an optional gate for fish passage, additional spill capacity, and/or debris removal and utilizes a different foundation. As shown in FIG. 6, the modular hydropower unit 10 comprises two modules 12, with each module 12 comprising three turbine generator units 14, although the number of modules and turbine generator units may vary based on the chosen site. Each module 12 also comprises a trash rack 16. As shown in FIG. 6, the modules 12 of the modular hydropower unit 10 may be sealed against an existing water retention structure 18 (e.g., a flood control structure, navigation lock, or overflow dam). Furthermore, the modular hydropower unit 10 may be installed without the use of a cofferdam prior to the arrival of the modular hydropower unit at the site.

Figure 7:
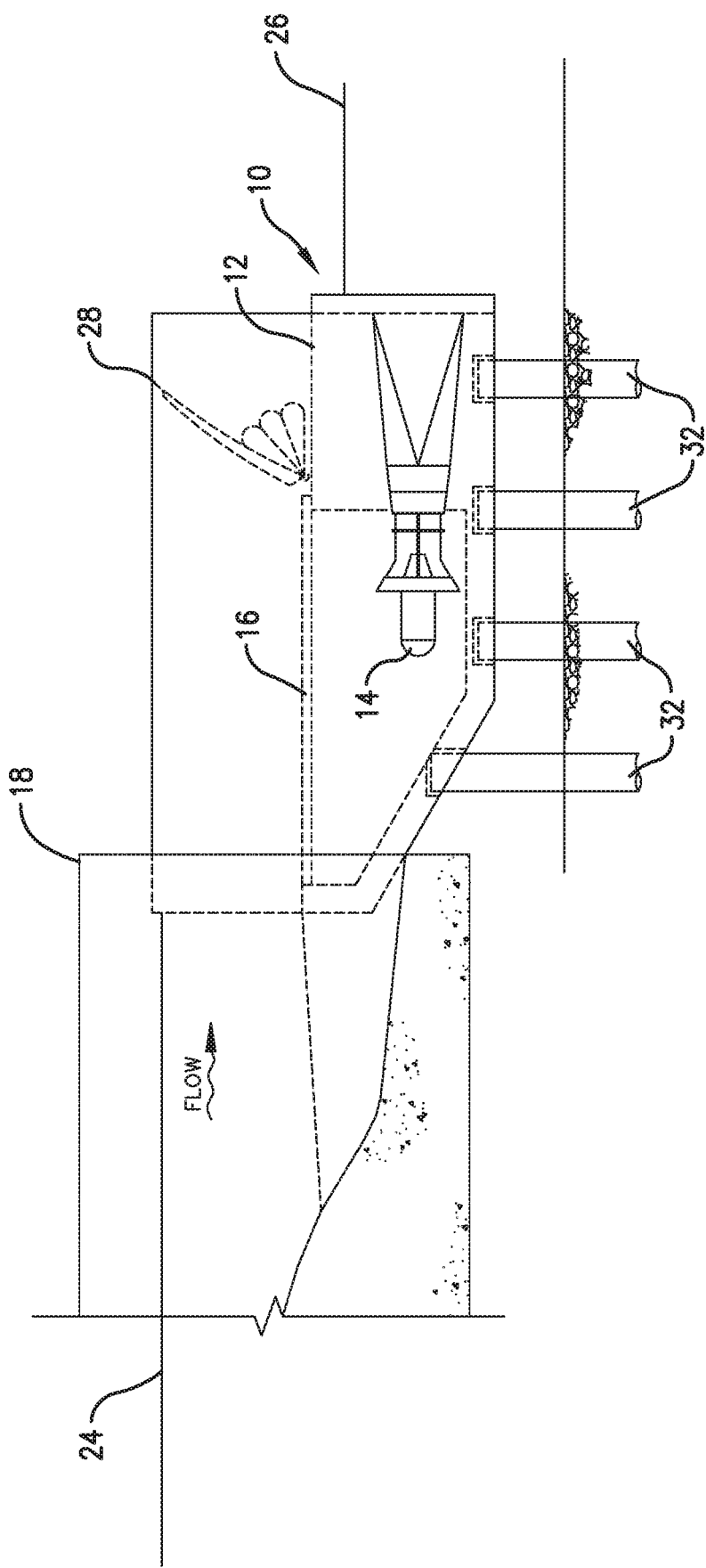
FIG. 7 depicts a side view of the alternative modular hydropower unit taken along line 7-7 of FIG. 6.

FIG. 7 depicts a side view of the modular hydropower unit 10 of FIG. 6. As shown in FIG. 7, the modular hydropower unit 10 may be installed on the foundation 32 without a cofferdam prior to the arrival of the module 12. The foundation 32 in FIG. 7 is in the form of a drilled shaft foundation. FIG. 7 also depicts the position of the headwater elevation 24 and the tailwater elevation 26 relative to the module 12.

Figure 8:
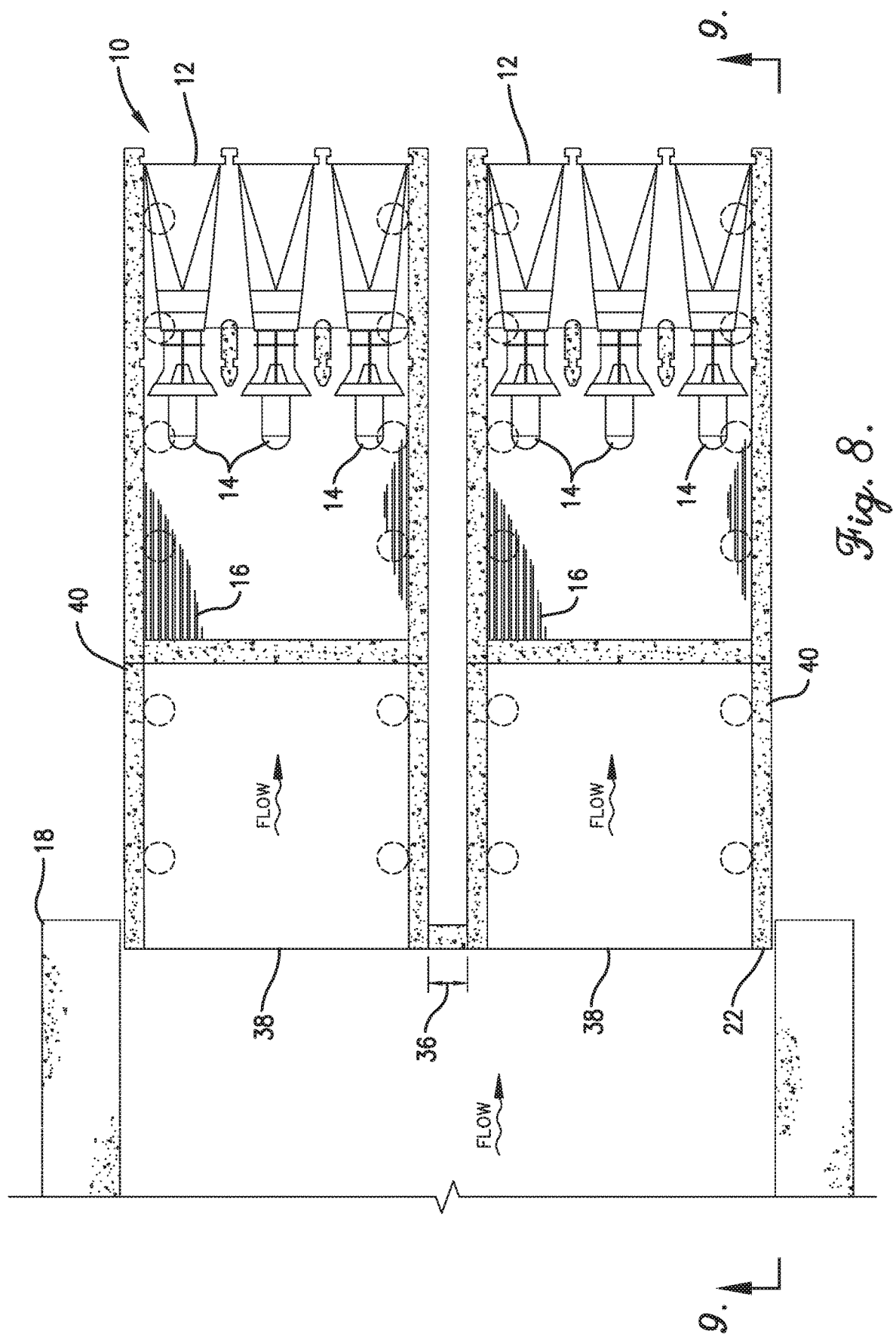
FIG. 8 depicts a plan view of a typical installation of a water conveyance structure in a modular hydropower unit of the present invention.

FIG. 8 depicts a plan view of a modular hydropower unit 10 used in conjunction with a water conveyance structure 38. As shown in FIG. 8, the water conveyance structure 38 can be sealed 40 against or connected to each module 12 forming the modular hydropower unit 10. In addition, FIG. 8 also depicts the area 36 where an optional gate may be introduced, which would allow for fish passage, additional spill capacity, and/or debris removal.

Figure 9:
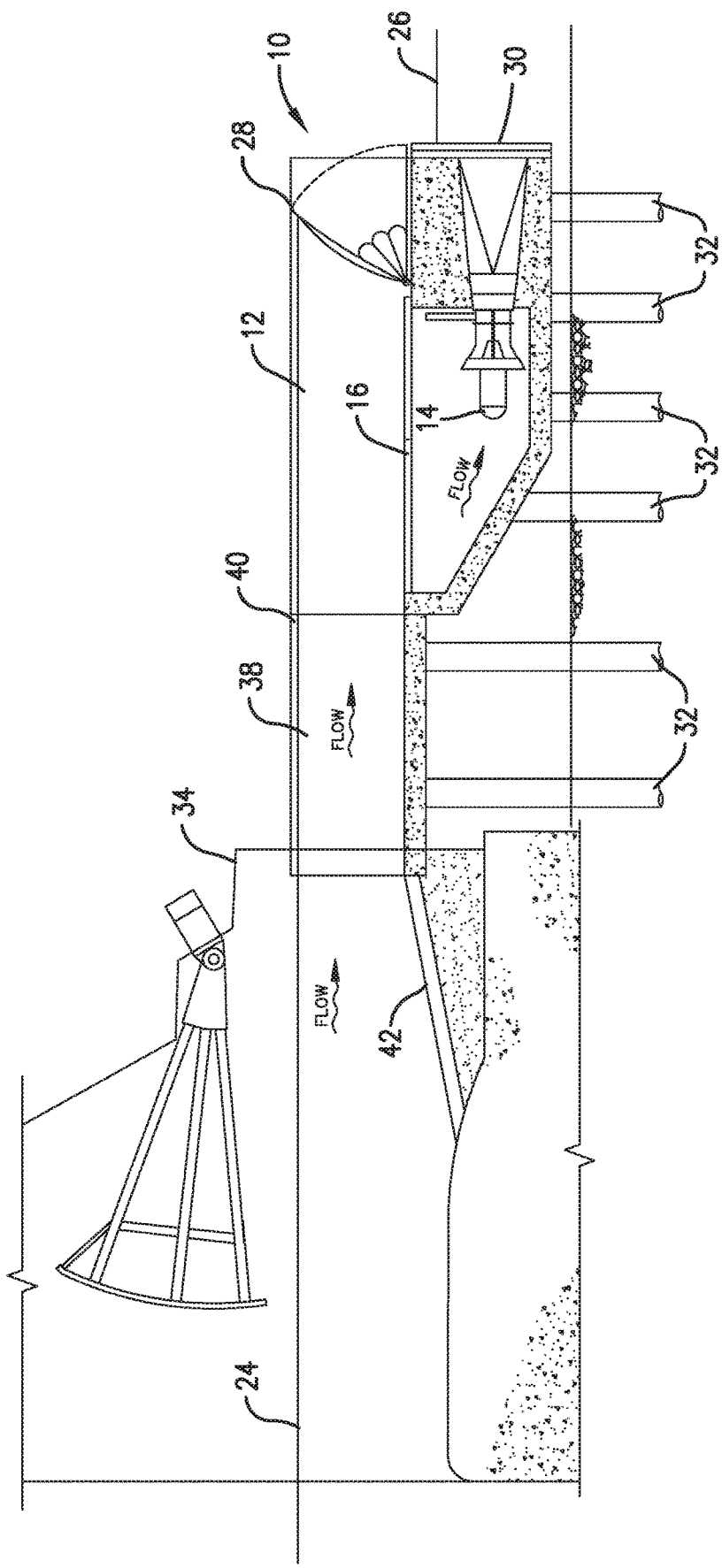
FIG. 9 depicts an elevation view of a typical installation of a water conveyance structure in a modular hydropower unit of the present invention taken along line 9-9 of FIG. 8.

FIG. 9 depicts an elevation view of a modular hydropower unit 10 used in conjunction with a water conveyance structure 38. As shown in FIG. 9, the water conveyance structure 38 can be sealed 40 against or connected to the modules 12 forming the modular hydropower unit 10. Furthermore, a transition mechanism 42 (e.g., a pipe, ramp, or incline) can be used to transition the water flow into the water conveyance structure 38. The foundation 32 in FIG. 9 is in the form of a drilled shaft foundation. Finally, FIG. 9 also depicts the position of the headwater elevation 24, tailwater elevation 26, the water-retaining spill gate 28, the water isolation gate guides 30, and the gated structure 34 relative to the module 12.

Figure 10:
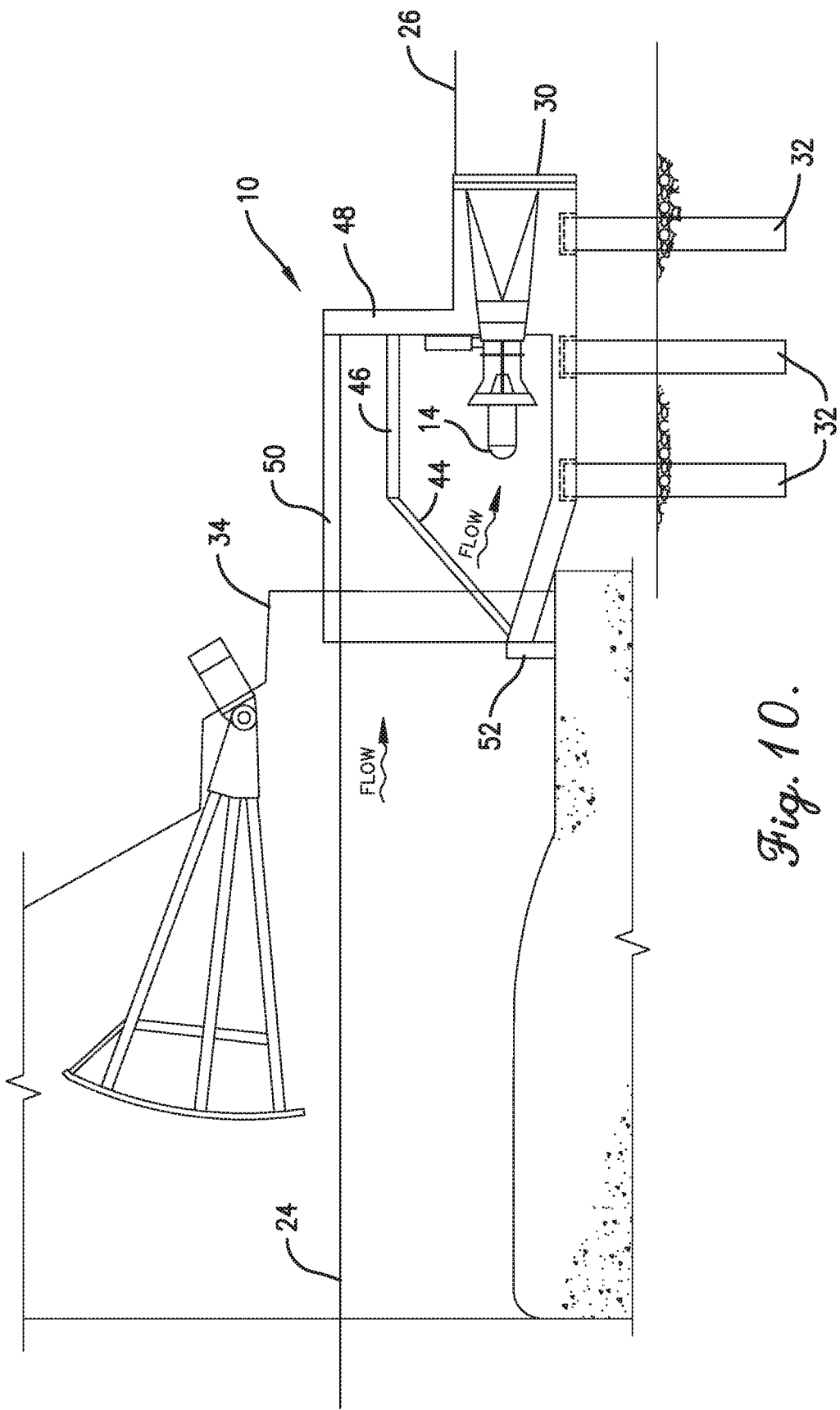
FIG. 10 depicts an elevation view of a typical installation of an inclined trash rack in a modular hydropower unit of the present invention.

FIG. 10 depicts an elevation view of a modular hydropower unit 10 used in conjunction with an inclined trash rack 44. As shown in FIG. 10, the inclined trash rack 44 can have an access hatch 46, which allows one to easily access the inside of the unit 10 to the turbine 14. The modular hydropower unit 10 can be used in conjunction with a downstream gate system 48, which can control the water level and release flood flows. The gate system 48 may also comprise walls 50 overtopping the module 12, which can facilitate the release of excess water flow during flood conditions. Moreover, as depicted in FIG. 10, the foundation 32 is in the form of a drilled shaft foundation. Finally, FIG. 10 also depicts the position of the turbine 14, the headwater elevation 24, the tailwater elevation 26, the water isolation gate guides 30, the gated structure 34 relative to the module 12, and the seal 52 placed after placement of the modular hydropower unit 10.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for producing a hydropower system, said method comprising:
    (a) providing a hydropower modular unit at a first location, wherein said hydropower modular unit comprises an intake, a trash rack, a turbine generator unit, and a draft tube; and
    (b) sealing said draft tube of said hydropower modular unit at the first location so that said hydropower modular unit floats in water;
    (c) floating said hydropower modular unit to a second location in a body of water;
    (d) unsealing said draft tube so that said hydropower modular unit can submerge into the body of water;
    (e) submerging said hydropower modular unit at the second location; and
    (f) installing said hydropower modular unit at the second location.

2. The method of claim 1, wherein said first location comprises a manufacturing facility.

3. The method of claim 2, wherein said second location comprises a low-head site.

4. The method of claim 1, wherein said installing comprises placing said hydropower modular unit:
    (i) within an existing gate bay,
    (ii) within an unused lock,
    (iii) as a section of a newly-constructed weir or dam,
    (iv) within a notch cut in an existing weir or dam, or
    (v) downstream or upstream of a low-head dam or weir.

5. The method of claim 1, wherein said installing is accomplished without a cofferdam.

6. The method of claim 1, further comprising:
    (g) providing one or more additional hydropower modular units at said first location; and
    (h) installing said additional hydropower modular units at said second location.

7. The method of claim 1, wherein said installing comprises sealing said hydropower modular unit with a foundation at said second location with an adjustable or rigid sealing system.

8. The method of claim 1, wherein said trash rack comprises a hatch for allowing access inside said hydropower modular unit.

9. A method for producing a hydropower system, said method comprising:
    (a) providing a hydropower modular unit at a first location, wherein said hydropower modular unit comprises an intake, a trash rack, a fully submersible turbine generator unit, and a draft tube;
    (b) sealing said draft tube so that said hydropower modular unit is buoyant;
    (c) floating said hydropower modular unit to a low-head site comprising a weir or dam;
    (d) unsealing said draft tube so that said hydropower modular unit is submerged at the low-head site; and
    (e) installing said hydropower modular unit at said low-head site so that said turbine generator unit is fully submerged at said low-head site.

10. The method of claim 9, wherein said first location comprises a manufacturing facility.

11. The method of claim 9, wherein said installing comprises placing said hydropower modular unit:
   (i) within an existing gate bay,
   (ii) within an unused lock,
   (iii) as a section of a newly-constructed weir or dam,
   (iv) within a notch cut in an existing weir or dam, or
   (v) downstream or upstream of a low-head dam or weir.

12. The method of claim 9, wherein said installing is accomplished without a cofferdam.

13. The method of claim 9, further comprising:
   (d) providing one or more additional hydropower modular units at said first location; and
   (e) installing said additional hydropower modular units at said low-head site.

14. The method of claim 9, wherein said installing comprises sealing said hydropower modular unit with a foundation at said second location with an adjustable or rigid sealing system.

15. The method of claim 9, wherein said trash rack comprises a hatch for allowing access inside said hydropower modular unit.

16. A portable hydropower modular unit, said portable hydropower modular unit comprising:
   (a) an intake having an opening,
   (b) a trash rack positioned on the opening of said intake,
   (c) a fully-submersible turbine generator unit in fluid communication with said intake,
   (d) a draft tube in fluid communication with said turbine generator unit and configured to be sealed so that said portable hydropower modular unit is buoyant, and
   (e) a water-retaining spill gate positioned above said turbine generator unit and operable to lower to release flood flows.

17. The portable hydropower modular unit of claim 16, wherein said portable hydropower modular unit comprises at least two turbine generator units and said trash rack comprises an inclined trash rack system.

\* \* \* \* \*